Aug. 11, 1953  W. H. VOGELSBERG  2,648,756
CONTROL APPARATUS FOR ELECTRIC HEATING UNITS
Filed April 14, 1949  4 Sheets-Sheet 1

Fig. 5b.  FLASH

Fig. 5c.  NORMAL

Inventor:-
Walter H. Vogelsberg
by his Attorneys
Howson and Howson

Aug. 11, 1953 — W. H. VOGELSBERG — 2,648,756
CONTROL APPARATUS FOR ELECTRIC HEATING UNITS
Filed April 14, 1949 — 4 Sheets-Sheet 3

Fig. 3a.

Fig. 3b. FLASH

Fig. 3c. NORMAL

Inventor:-
Walter H. Vogelsberg
by his Attorneys
Howson and Howson.

Aug. 11, 1953 W. H. VOGELSBERG 2,648,756
CONTROL APPARATUS FOR ELECTRIC HEATING UNITS
Filed April 14, 1949 4 Sheets-Sheet 4

Inventor:-
Walter H. Vogelsberg
by his Attorneys
Howson and Howson.

Patented Aug. 11, 1953

2,648,756

UNITED STATES PATENT OFFICE 2,648,756

CONTROL APPARATUS FOR ELECTRIC HEATING UNITS

Walter H. Vogelsberg, Wayne, Pa., assignor to Proctor Electric Company, Philadelphia, Pa., a corporation of Pennsylvania Application April 14, 1949, Serial No. 87,462

17 Claims. (Cl. 219—20)

This invention relates to control systems for electrical heating units and more particularly to a flasher system wherein an electric range heating unit is automatically overenergized for a limited period of time and thereafter is operated under normal energization.

In my prior copending application Serial No. 81,936 filed March 17, 1949, there is disclosed a control device that will perform all of the functions incident to automatic flashing and normal energization control of an electric range heating unit. Although that device represents an advance in the flasher art, it has certain features upon which improvement can be made. For example, it was observed that the prior device has a critical speed of control knob rotation. If by an extremely rapid manual manipulation of the control knob this speed is exceeded, the latching system of said device fails to latch properly and flashing does not occur. It was found also that the latching of that device requires holding the dimensions of the cooperating members of the latching system to within rather close tolerances. Further, that device has a rather large inoperative range of control knob displacement near its "off" position. The subject matter of this application is also related to that of Serial No. 157,933 filed April 25, 1950, and Serial No. 250,326 filed October 8, 1951, both having the same inventor and assignee as this application.

One object of the present invention is to provide a new and improved flasher system in which the flash-control contacts are preset in position for flash operation when the system is in the off condition, thereby obviating the above-mentioned objections.

A first result of the provision of such a system is the reduction in the tendency for faulty latching when the control knob is rotated rapidly. As the control knob of the device disclosed in the aforementioned application is rotated to select a desired heat, the flash-control contacts are moved from a position of rest to a latched-in position. In the present invention, however, the flash-control contacts are at rest in the latched-in position when the control knob is in the "off" position. Therefore rapid manipulation of the control knob from the "off" position to select a desired heat does not disturb the flash-control contacts but merely adjusts other blades that are cam-controlled.

The provision of a system that presets for flash in the off position also permits the use of a latching system that is relatively insensitive to manufacturing tolerances and to wear. The critical nature of the dimensions in the aforementioned prior device is a result of the adaptation of its latching system to release the flash-control contacts from the flash position when the control knob is turned to "off." This adaptation is necessary for it provides for the manual interruption of a flash cycle by merely turning the device off. No such adaptation need be made in the present invention, for the system disclosed herein can effect the interruption of a flash cycle manually without disturbing the flash-control contacts.

Furthermore, in the aforementioned prior device, a discrete range of control knob displacement is provided in the off position through which the work of releasing the flash-control contacts from the position for flash operation can be performed. By providing the flasher system of the present invention, this function and, therefore, the control knob displacement through which the function is performed, are eliminated, thereby reducing the inoperative range and providing a larger angular displacement for control programming.

Another object of this invention is the provision of a simple switch arrangement that has all the economies of the device of the aforementioned application and, in addition, eliminates mid-positioning of one of the flash-control contacts as a requirement for disconnecting the heating unit from the power supply in the off position. In accordance with the present invention, the connections are arranged in a different manner so that the disconnect is accomplished inherently without resorting to mid-positioning one of the flash-control contacts.

In addition to being an improvement over the device of my prior application, the present invention is an improvement over other prior devices wherein the flash-control contacts are preset for flash when the manual control member is in the off position. Such prior devices have been generally unsatisfactory, particularly from a commercial standpoint. It is highly desirable to provide a system wherein variable input to the heating unit is effected during normal operation by controlled making and breaking of the circuit supplying said unit, as distinguished from discrete input control. At the same time, it is essential that the flashing and input controlling operations shall not interfere with each other. The present invention makes it possible to provide such a system.

A further object of this invention, therefore, is to provide an improved and commercially practical system of the character above-mentioned.

Other objects and features of the invention will appear hereinafter.

In the accompanying drawings:

Fig. 2b illustrates the positions of the switch blades, the latch mechanism, and the thermostatic switch during flash operation of the system of Fig. 2a;

Fig. 2c is similar to Fig. 2b except that the elements are shown in the position for normal operation;

Fig. 3b illustrates the positions of the switch blades, the latch mechanism, and the disconnect switch during flash operation of the system of Fig. 3a;

Fig. 5a illustrates a variation of the basic circuit of Figs. 2a, 3a and 4a.

Figure 1:
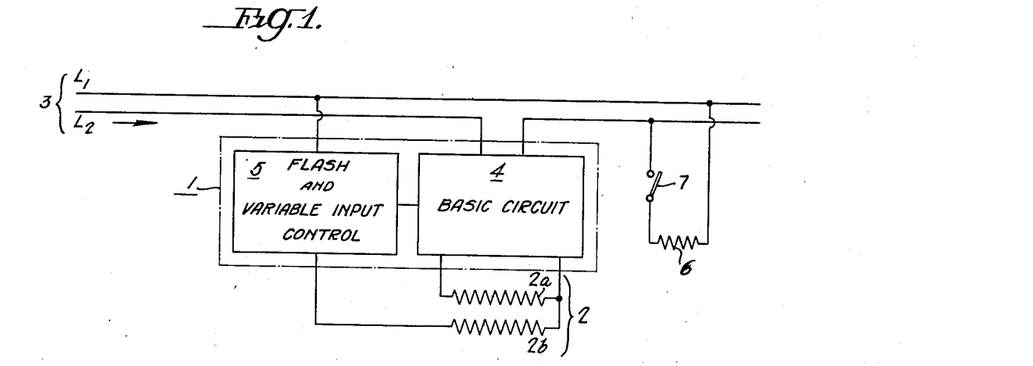
Fig. 1 is a block diagram of the flasher systems of the present invention.

The electric range flasher systems of the present invention can be represented conveniently in block diagram form as shown in Fig. 1. A control device 1 is shown for governing the energization of a two-section heating unit 2 from a two-wire electrical power supply 3. The control device 1 is divided arbitrarily into a basic circuit 4 and a flash-and-variable-input controller 5. The specific functions of the basic circuit 4 and the controller 5 will be discussed hereinafter.

The control device 1 effects the flashing of the heating unit 2 by arranging sections 2a and 2b of said heating unit in parallel across the power supply 3; and said control device effects the normal operation of the heating unit 2 by arranging the sections 2a and 2b in series across the power supply 3. If the sections 2a and 2b are assumed to be of equal resistance, the power supplied to the heating unit 2 during flash is four times the power supplied during normal operation. It is obvious that this over-energization will cause the heating unit 2 rapidly to attain a desired operating temperature. Of course, the sections 2a and 2b need not be of equal resistance, this condition being assumed merely for convenience.

To prevent exceeding the capacity of the electric range during flash, the control device 1 acts to drop any subsequent load during that interval. In Fig. 1 (and similarly in the other figures) the power supply is assumed to be from the left, and the subsequent load is represented by a single heating unit 6 having a control switch 7.

Figure 2A:
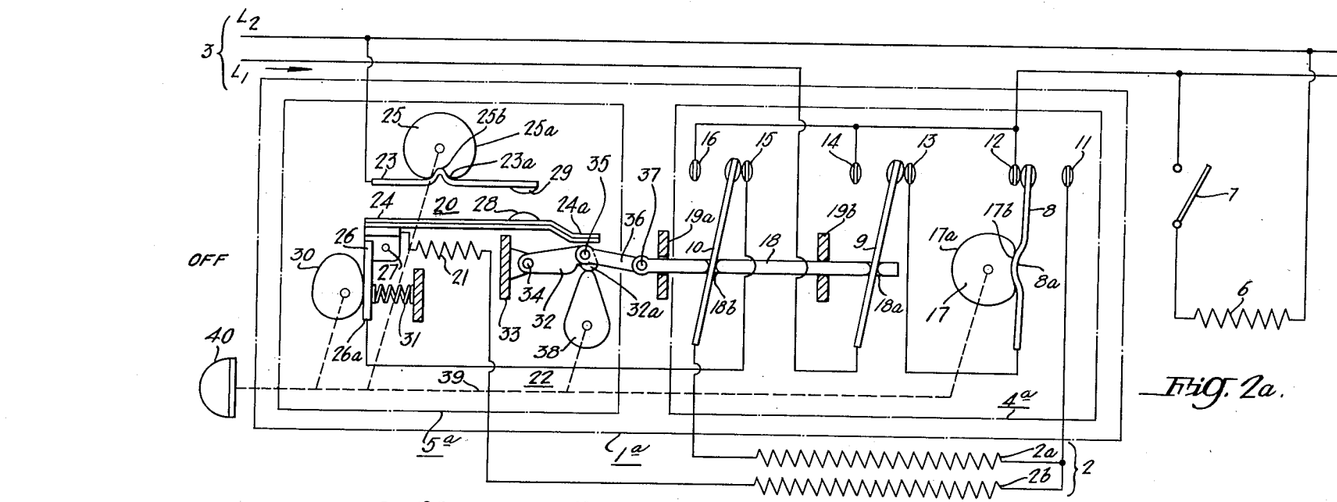
Fig. 2a is a schematic diagram of a flasher system which includes flash and variable input control means that interrupts flash mechanically, the system being shown in the "off" position.
Figures 2B, 2C:
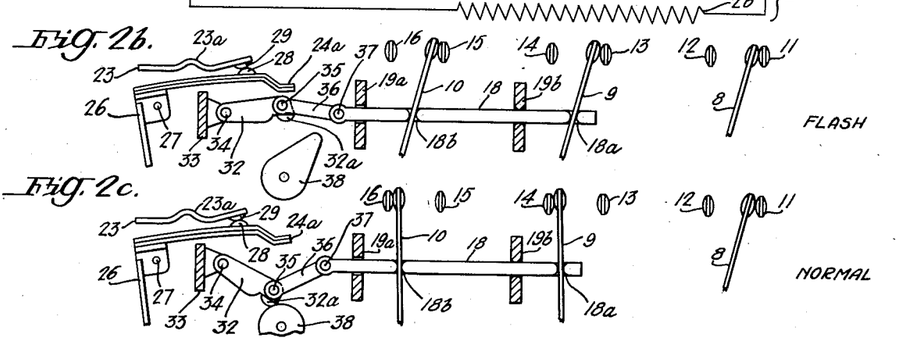

In Fig. 2a, a control device 1a is shown comprising a basic circuit 4a and a flash-and-variable-input controller 5a. The control device 1a has an "off" position as shown in Fig. 2a, and two operative positions: one for "flash" as indicated in Fig. 2b and the other for normal operation or "run" as indicated in Fig. 2c.

The basic circuit 4a includes three resilient switch blades 8, 9, and 10 and six stationary contacts, 11 to 16. Blade 8 is arranged to make contact with either contact 11 or contact 12; blade 9 makes contact with either contact 13 or contact 14; and blade 10 makes contact with either contact 15 or contact 16. The blades are fixed at their lower ends and have current carrying contacts welded or riveted to their free ends. Blade 8 is resiliently self-biased toward the left and cooperates with a manually controllable cam 17 and the associated contacts 11 and 12 to form a simple single-pole-double throw switch. The program on cam 17 includes a circular portion 17a and an indented portion 17b. A projection 8a on blade 8 coacts with the indented portion 17b to give an "off" position, and with the circular portion 17a to give an "on" position. Blades 9 and 10 are also resiliently self-biased toward the left and are arranged in ganged-relation so that they may be held in the right-hand position—the position for flash operation—by a flash bar 18. Flash bar 18 is made of an insulating material and is provided with appropriate slots 18a and 18b to accommodate blades 9 and 10. The flash bar 18 is slidably mounted at 19a and 19b. It should be understood that the mounting for the flash bar in this and in the other diagrams to be described hereinafter may take other forms obvious to those skilled in the art.

Connection is made between $L_1$ and switch blade 9, between the stationary contact 13 and switch blade 8, between stationary contacts 12, 14, 16 and $L_1$, between stationary contact 15 and the flash-and-variable-input controller 5a, between the stationary contact 11 and the junction of the sections 2a and 2b of the heating unit 2, and between the switch blade 10 and the other end of section 2a of said heating unit.

The flash-and-variable-input controller 5a includes a manually operable thermostatic switch 20, a heater 21 adapted to thermally actuate said switch, and a latch system 22. In the thermostatic switch 20 are included two switch blades 23 and 24. Blade 23 is fixed at its left-hand end and is connected at that end to line $L_2$ of the power supply 3. The blade is manually adjustable through a cam 25 which has a circular portion 25a and an indented portion 25b. Blade 23 is resiliently self-biased against cam 25 and is provided with a projection 23a which coacts with the indented portion 25b to give an "off" position and with the circular portion 25a to hold said blade in the operative position. Blade 24 is a bi-metallic thermomotive element which forms the heat responsive member of the thermostatic switch 20. The heater 21 is connected to the left-hand end of blade 24 and is connected in series with section 2b of the heating unit 2. Also connected to the left-hand end of this blade is contact 15 of the basic circuit 4a. Blade 24 is securely fastened at its left-hand end to a support 26 which is pivotally mounted at 27, and said blade has its free end offset at 24a to engage the latch system 22. A contact 28 is mounted on blade 24 adjacent to the offset 24a and is arranged to cooperate with a contact 29 mounted on the free end of blade 23. A manually adjustable control cam 30 is used to position the thermomotive element 24 about the pivot 27. A spring 31 holds a foot 26a of the support 26 against the periphery of the cam 30.

The heater 21 may be mounted on the thermomotive element 24, and the two may be insulated from each other by a sheet of mica (not shown) or any suitable insulating material. Further, the assembly of thermomotive element, insulating material, and heater may be wrapped with asbestos (also not shown) so that the element 24 heats and cools at a rate substantially similar to the heating unit being controlled by the control device. The construction of such assemblies is discussed at length in the aforementioned patents and copending application.

The latch system 22 in this particular embodiment of the invention includes an overcenter toggle type of latch. Said latch system includes a link 32 pivoted at one end to a fixed point 33 as shown at 34. The opposite end of the link 32 is pivoted, as shown at 35, to a second link 36, the latter being pivoted at 37 to the flash bar 18. A pad 32a is formed on link 32 to provide a surface through which the latch system 22 is set into an "in-toggle" position (Figs. 2a and 2b) by rotation of a manually operable cam 38. The pad 32a also acts as a limit stop for the links 32 and 36 to maintain a fixed overcenter travel when the latch system 22 is in the latched-in position.

The cams 17, 25, 30 and 38 are all mounted on a common shaft as represented at 39, and the shaft is operable by a single control knob 40. Suitable markings (not shown) may be provided on the control knob to indicate the angular position of the shaft 39 and its associated cams in terms of the heat input to the heating unit 2.

In the "off" position of the control device 1a, as shown in Fig. 2a, the heating unit 2 is totally disconnected from lines $L_1$ and $L_2$ of the electrical supply 3. The basic circuit 4a provides a disconnect from $L_1$ by a dual action as follows. First, assuming the control device 1a is operating the heating unit 2 on flash or normal energization, when the control knob 40 is rotated in either direction to the "off" position, the projection 8a of blade 8 rides into the indented portion 17b of cam 17 thereby breaking the circuit between blade 8 and contact 11. Secondly, assuming the control device 1a is operating the heating unit on normal energization when the control knob 40 is rotated in either direction to the "off" position, the cam 38, acting through pad 32a, forces the toggle links 32 and 36 overcenter and moves blades 9 and 10 into position for flash operation, thereby breaking the circuit between blade 10 and contact 16. If the control knob 40 is rotated to the "off" position during flash, the cam 38 does not disturb the latch system 22 for it already is in the latched-in position (see Fig. 2b).

The flash-and-variable-input controller 5a provides a disconnect from $L_2$, for as the control knob 40 is rotated in either direction to the "off" position, the projection 23a of blade 23 rides into the indented portion 25b of cam 25, and the spring 31 forces the foot 26a of support 26 against control cam 30 to rotate the blade 24 clockwise around pivot 27, thereby effecting the separation of contacts 28 and 29.

When the control device 1a is in the "off" position, it is possible to energize the subsequent load, shown as the heating unit 6, for circuit connections can be established from $L_1$, through blade 9, contact 13, through blade 8, contact 12 and thence to heating unit 6.

When the control knob 40 is rotated to a particular setting to select a desired heat, several functions are performed simultaneously to initiate the flashing of the heating unit 2. Contacts 28 and 29 are forced into engagement as blades 23 and 24 are manipulated by cams 25 and 30 respectively; blade 8 is manipulated by cam 17 so that it engages stationary contact 11; and cam 38 is rotated out of the way by the toggle links 32 and 36, so that said links can trip later without interference by said cam. Fig. 2b shows the change in position of blade 8 of the basic circuit 4a during flash and the conditioning of the thermostatic switch 20 of the controller 5a at some point during the flash cycle.

The connections established to accomplish flash are as follows: Current from $L_1$ flows through the blade 9, the contact 13, the blade 8, the contact 11, and thence to the junction of sections 2a and section 2b of the heating unit 2. At this junction the current divides, part of the current proceeds through section 2a and then through blade 10 and contact 15, while the rest of the current flows through section 2b, through the heater 21 to the lower end of blade 24 where it meets the current flowing from section 2a. The full flash current then flows through blade 24, contacts 28 and 29, through blade 23 to line $L_2$.

The connections effected in the basic circuit 4a, in addition, have accomplished the deenergization of heating unit 6. As can be seen from Fig. 2b, the continuity of line $L_1$ is interrupted since blade 8 is no longer in engagement with contact 12.

As the flashing cycle progresses, the thermomotive element 24 actuated by the heater 21 flexes at such a rate that it substantially tracks with the temperature of the heating unit 2. When the thermomotive element 24 attains a temperature substantially in proportion to the desired operating temperature of the heating unit 2, it engages through its offset 24a the toggle links 32 and 36 at 35 and forces said links overcenter. This permits the flexible blades 9 and 10 to move the flash bar 18 to the left, thereby interrupting the flash operation and establishing the connections for normal operation. The contacts 28 and 29 remain closed until the toggle links have been released. This insures that the thermomotive element 24 is heated continuously throughout the flash cycle and relieves the contacts 28 and 29 of the duty of interrupting flash current.

The position of the blades 8, 9 and 10 and the conditioning of the latch mechanism 22 during normal energization are shown in Fig. 2c. The connections established to accomplish normal energization are as follows: current from line $L_1$ flows through blade 9, contact 14, to contact 16, through blade 10, through sections 2a and 2b of the heating unit 2 connected in series, thence through heater 21, blade 24, contact 28, contact 29, blade 23 to line $L_2$.

The connections effected in the basic circuit 4a for the normal energization of the heating unit 2 provides for the positive restoration of the subsequent load. Thus continuity of power supply to heating unit 6 is effected, for current can flow from line $L_1$, through blade 9, contact 14, through control switch 7, heating unit 6 and thence to line $L_2$.

During normal operation, the heating unit 2 is operated substantially at the selected temperature on a time-percentage of energization basis. The average wattage input necessary to maintain this temperature is governed by the cyclic opening and closing of contacts 28 and 29. When said contacts are closed, the thermomotive element 24, thermally actuated by the heater 21, flexes downward until said contacts disengage, thereby deenergizing the heating unit 2 and heater 21. The deenergization of heater 21 permits the thermomotive element 24 to cool until the contacts 28 and 29 reengage to start the cycle over again.

The ability of the thermomotive element 24 to track with the temperature of the heating unit 2 prevents the reflashing of the heating unit to excessive temperatures. If reflash is attempted by turning the control knob 40 through "off" position to a selected heat, the blades 9 and 10 are set into flash position, but the length of the flash cycle is reduced to a time interval sufficient only to raise the heating unit to the newly selected temperature. If the newly selected temperature is less than that previously set, the element 24 will immediately trip the latch system 22 to interrupt flash. Said element will continue to cool and keep the unit deenergized until it reaches a temperature substantially in proportion to the selected temperature of the heating unit, whereupon it will operate the unit on normal energization at the selected temperature.

Figure 3A:
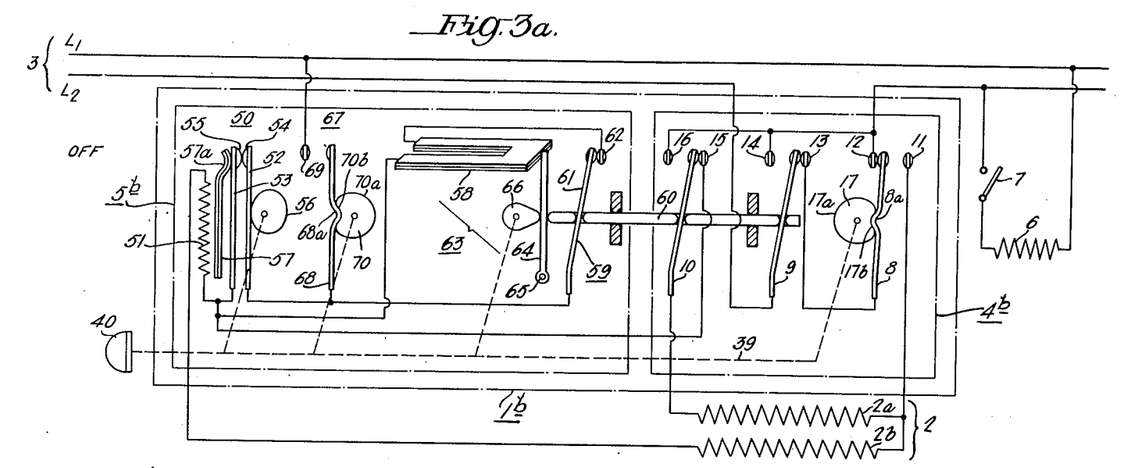
Fig. 3a shows another embodiment of the invention wherein the flash and variable input control means employs a current operable latch release for interruption of flash.

The control device 1b shown in Fig. 3a is similar to the control device 1a shown in Fig. 2a except for differences in their respective flash-and-variable-input controllers 5a and 5b. (The controller 5b is similar to the arrangement which accomplishes flash and variable input control in the afore-mentioned copending application No. 81,936.)

The controller 5b includes a thermostatic switch 50 for controlling flash time and variable input, and a heater 51 in circuit with the heating unit 2 for thermally actuating said switch according to the energization of said heating unit. The switch 50 includes a set of resilient switch blades 52 and 53 which are fixed at their lower ends and are provided with a set of cooperating contacts 54 and 55 affixed to the free ends thereof. Switch blade 52 is resiliently self-biased against a manually operable control cam 56, and switch blade 53 is resiliently self-biased against a thermomotive element 57 which is arranged to flex toward the left. The thermomotive element 57 is fixed at its lower end and is provided with an offset at 57a through which it engages blade 53. The heater 51 is arranged to thermally actuate the thermomotive element 57 so that it will flex and permit contacts 54 and 55 to separate.

Arranged in shunt across the switch blades 53 and 54 of the thermostatic switch 50 is the series combination of a bimetallic prop latch 58 and a latch switch 59 operable by a flash bar 60. The latch switch 59 comprises a resilient switch blade 61 and a stationary contact 62. The blade 61 is fixed at its lower end, is self-biased toward the left, and is provided with a contact at its free end that cooperates with the stationary contact 62. The switch 59 is closed when the flash bar 60 is in the flash position and is open when said bar is in the position for normal operation.

The bimetallic prop latch 58 forms both the propping member and the releasing member of the latch system 63 which further includes a latch bar 64, and the flash bar 60. The latch 58 is a U-shaped member, the legs of which are fixed at their ends, and the free portion of which is arranged to flex upward when the latch is energized. Said latch acts as a prop for the latch bar 64 which is a rigid member pivoted at 65. The latch bar 64 in turn governs the position of the flash bar 60 which consequently controls the positions of blade 61 of the controller 5b and blades 9 and 10 of the basic circuit 4b. A cam 66 cooperates with the latch bar 64 for manually setting the latch system 63 into a latched-in position.

The controller 5b further includes a switch 67 which, in the "off" position of the control device 1b, serves to disconnect the heating unit from line L₂ of the power supply 3. The switch 67 comprises a resilient switch blade 68 and a stationary contact 69 which is arranged to engage a cooperating contact mounted on said blade. The blade is self-biased toward the right against a manually operable cam 70. This cam has a circular portion 70a and an indented portion 70b. The blade 68 has a projection 68a which coacts with the indented portion 70b to give an "off" position and with the circular portion 70a to give an operative position.

The cams 17, 66, 70 and 56 are all mounted on the same shaft as represented at 30 and operated by the control knob 40.

Figure 3B:
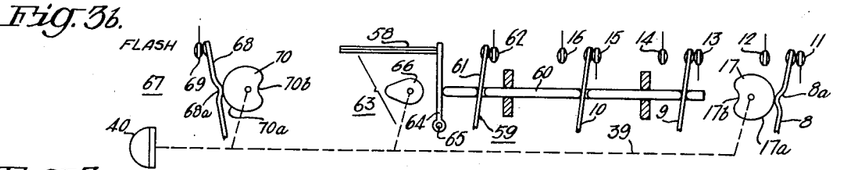

When the control knob 40 of control device 1b is rotated to a particular setting to select a desired heat, flash (see Fig. 3b is initiated automatically. Basic circuit 4b is similar to basic circuit 4a of Fig. 2a and operates in the same manner. Thus blade 8 is manipulated by cam 17 so that it engages stationary contact 11, and blades 9 and 10, which are preset in the flash position, are undisturbed. The flash and variable input controller 5b is conditioned on rotation of the control knob 40 to accomplish results substantially similar to those of the controller 5a of Fig. 2a. The latch switch 59 is left undisturbed in the flash position; the cam 66 is rotated out of the way of the latch bar 64 so that the latch system 63 can trip without restraint; blade 68 is manipulated by cam 70 so that it engages stationary contact 69; and the thermostatic switch 50 is adjusted by the control cam 56 by urging the set of switch blades 52 and 53 against the offset 57a of the thermomotive element 57, thereby displacing said element in accordance with the selected temperature.

Figure 3C:
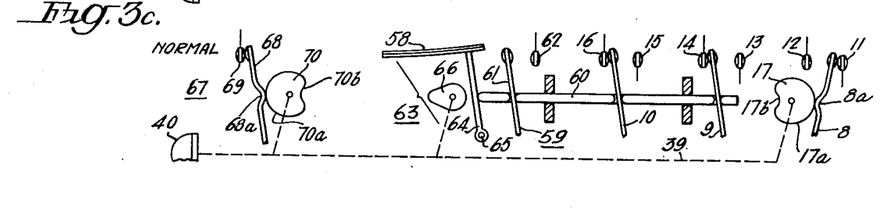
Fig. 3c is similar to Fig. 3b except that the elements are shown in the position for normal operation.

The connections for flash operation of the heating unit 2 established by control device 1b differ only slightly from those established by control device 1a. In both cases the sections 2a and 2b are arranged in parallel across the power supply 3. However, control device 1b has in addition the bimetallic prop latch 58 and latch switch 59 in shunt across the contacts 54 and 55, the latter effectively short-circuiting the latch 58. During the execution of the flash cycle, the thermomotive element 57 flexes to the left as it is thermally actuated by heater 51 at a rate proportional to the energization rate of the heating unit 2. When the thermomotive element 57 attains a temperature substantially in proportion to the selected or desired operating temperature of said heating unit, the contacts 54 and 55 separate. This permits the full flash current, which was originally shared by the contacts 54 and 55 and bimetal latch 58 to be directed through the bimetal latch 58 causing it to flex rapidly by the heat generated therein, releasing the latch bar 64. This permits the blades 8, 9, and 61 to force the flash bar 60 and latch bar 64 to the left and thereby interrupt the flash cycle. Said blades and latch system 63 now assume the position for normal energization shown in Fig. 3c. The connections established are similar to those of the control device 1a as shown in Fig. 2c. The sections 2a and 2b of the heating unit are connected in series across the power supply 3 and are operated at the selected temperature by the cyclic opening and closing of contacts 54 and 55. During normal operation the bimetallic prop latch 58 is out of the circuit because latch switch 59 is open.

Figure 4A:
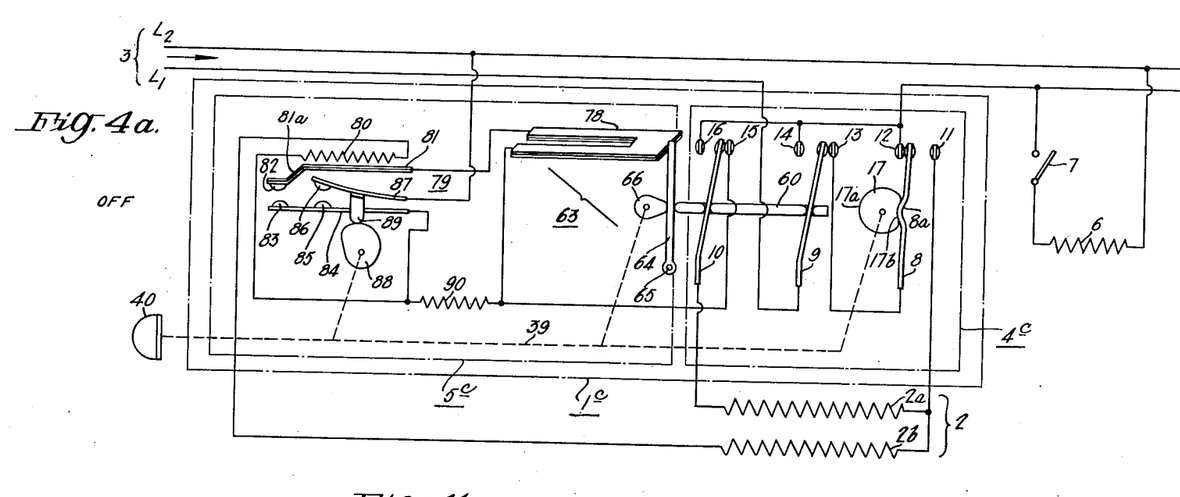
Fig. 4a shows a modified form of the embodiment shown in Fig. 3a, the system being in the "off" position.

Fig. 4a shows a flasher system which includes a control device 1c that uses the self-heated bimetallic prop latch 58 of control device 1b for interrupting flash but eliminates the need for the flash bar controlled latch switch 59 of that control device. The control device 1c includes a basic circuit 4c which is similar in construction and operation to the basic circuits 4a and 4b and a flash-and-variable-input controller 5c that performs the same general functions as the controllers 5a and 5b.

The flash and variable input controller 5c includes a thermostatic switch 79 for controlling flash time and variable input, and a heater 80 in circuit with the heating unit 2 for thermally actuating said switch according to the energization of said heating unit. The heat responsive member of switch 79 is a thermomotive element 81 which is fixed at its right hand end and is arranged to flex downward when thermally conditioned by heater 80. A contact 82 is mounted upon an offset 81a at the free end of the thermomotive element 81 and is arranged to cooperate with a contact 83 mounted at one end of a flexible blade 84. Said blade is fixed at the right hand end and is provided with another contact 85 mounted near its free end but below contact 84. Contact 85 cooperates with a contact 86 mounted on another resilient blade 87. Said blade also is fixed at its right hand end and has its free end positioned by a control cam 88 through a cam follower 89. The follower 89 is an L-shaped member made preferably of some insulating material. One leg of the L is fixed to the body of the blade 87 and the end of the other leg of the L engages the periphery of the cam 88 against which it is held by the self-bias of blade 87. The control cam 88 is mounted on the control shaft 39 along with cams 17 and 66 and is controlled by the control knob 40.

Blade 87 is connected to line L₂; blade 81 is connected to one leg of the U-shaped bimetallic latch 78; the other leg of the said latch is connected to both the basic circuit 4c and to one end of an auxiliary resistor 90 whose function will be explained hereinafter; the other end of this resistor is connected to both blade 84 and to one end of the heater 80; and the other end of this heater is connected to section 2b of the heating unit.

When the control knob 40 is rotated to select a desired heat, the basic circuit 4c and the flash-and-variable input controller 5c are conditioned to initiate flash automatically. The conditioning of the basic circuit 4c is similar to that effected in the basic circuits 4a and 4b under similar circumstances. Moreover, the cam 66 of controller 5c is rotated out of the way of latch bar 64 as with controller 5b of Fig. 3b.

The conditioning of the thermostatic switch 79 and the specific connections effected in the controller 5c will be pointed out below for they differ from the two previous flasher systems. As the control cam 88 is rotated by control knob 40, the free end of blade 87 positioned by said cam through follower 89 engages contact 85 and flexes blade 84 downward. The amount of flexure given to blade 84 determines the temperature that the thermomotive element 81, thermally actuated by the heater 80, must attain for the contact 82 to engage contact 83 and thereby signal the end of the flash cycle. The flexure of blade 84 further governs the operating temperature of the heating unit during normal operation, for it determines the temperature which the element 81 must attain for said element to engage blade 84 and cause contact 85 to disengage contact 86.

Figure 4B:
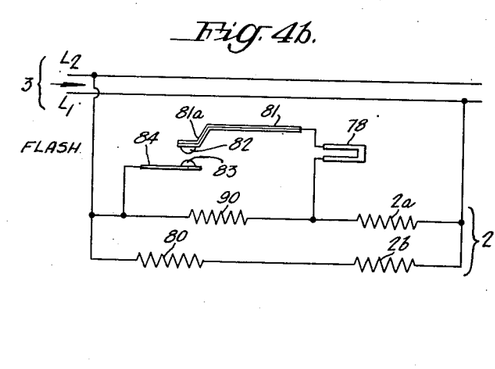
Fig. 4b is a simplified diagram of the circuit connections of the system of Fig. 4a during flash.

The circuit connections established in the controller 5c during flash are shown in simplified form in Fig. 4b. To flash the heating unit 2, the sections 2a and 2b are arranged in parallel across the power supply 3 as in the other flasher systems herein disclosed. However, in one branch of this parallel circuit, namely the one containing section 2a, there is included the auxiliary resistor 90, which has shunting it the bimetallic prop-latch 78 serially connected to the thermomotive element 81 and the normally-open contacts 82 and 83. The contacts 85 and 86 and the blade 87 are not shown in the schematic of Fig. 4b but are used, nevertheless, to carry the current from contact 83 and resistor 90 to line L₂. The heater 80 is included in the other branch of the parallel circuit.

The interruption of flash is initiated when contact 82 mounted on the thermomotive element 81 engages contact 83. This permits sufficient current to by-pass through the bimetallic latch 78 to cause it to heat rapidly and consequently flex upward to release the latch bar 64. The blades 9 and 10 can then move to the left thereby interrupting flash and instituting normal operation of the heating unit.

Figure 4C:
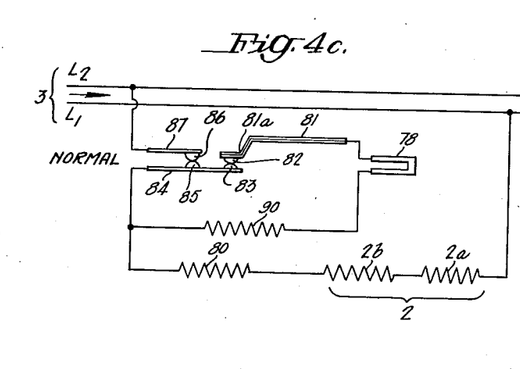
Fig. 4c is a simplified diagram of the circuit connections of the system of Fig. 4a during normal operation.

The circuit connections established in the controller 5c during normal operation are shown in simplified form in Fig. 4c. Connected in series across the power supply 3 are the sections 2a and 2b of the heating unit 2, the heater 80 and the set of contacts 85 and 86. The input rate during normal energization is controlled by the cyclic opening and closing of these contacts. When these contacts are closed, the thermomotive element 81 is thermally actuated by the heater 80 causing it to flex downward and thereby effect the separation of said contacts after an interval determined by the input rate. When these contacts are open, the thermomotive element cools and thereby permits the contacts to close after an interval also dependent upon the same input rate.

The branch circuit comprising the auxiliary resistor 90, the prop latch 78, the thermomotive element 81 and the contacts 82 and 83 plays no effective role during normal operation. There is an interval in the heating cycle of the thermomotive element 81 and an interval in the cooling cycle of said element during which both contacts 82 and 83 and contacts 85 and 86 are engaged. The resistance of this branch circuit is so much greater than the resistance of the section of blade 84 which it shunts that the amount of current by-passed during these intervals is negligible.

Figure 5A:
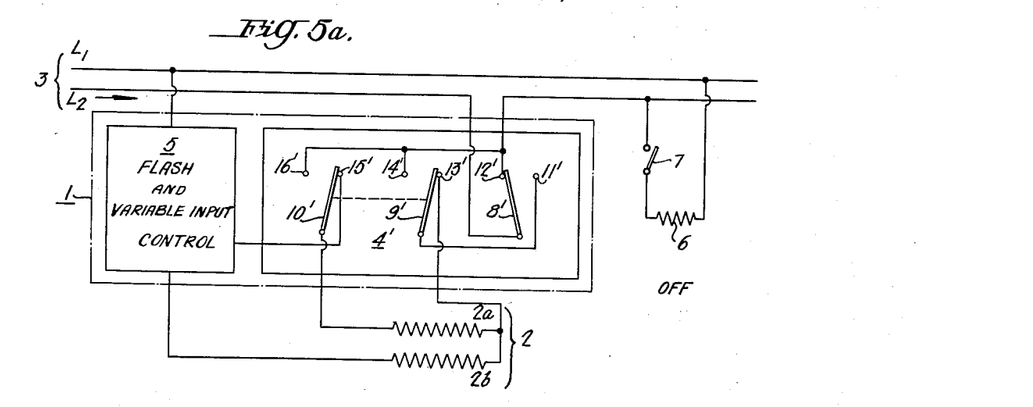

As has been pointed out, the basic circuits 4a, 4b and 4c of Figs. 2a, 3a, and 4a, respectively, are similar. The basic circuit consists of three switch blades 8, 9, and 10 and the six contacts 11 to 16, two of these contacts being associated with each of these switch blades. One of the blades, designated as 8, is arranged for on-off operation, and the other two, blades 9 and 10 are flash controlled. Fig. 5a shows a basic circuit 4' that also includes these switch blades designated as 8', 9' and 10' and six stationary contacts designated as 11' to 16'. Furthermore the blade 8' is arranged for on-off operation and the blades 9' and 10' are flash-controlled. The connections within the basic circuit 4', however, differ from those within the basic circuit 4a, 4b, or 4c, although either basic circuit acting as an entity performs functions similar to those of the other basic circuit.

Thus in the "off" position the basic circuit 4' acts to disconnect the heating unit 2 from line $L_1$ of the power supply 3 and to provide continuity of power supply to the subsequent load 6. The heating unit 2 is disconnected from $L_1$ because 11' is deenergized and because blade 10' does not engage contact 16'. Continuity of power supply is provided from $L_1$, through contact blade 8', contact 12' to the subsequent load 6.

Figure 5B:
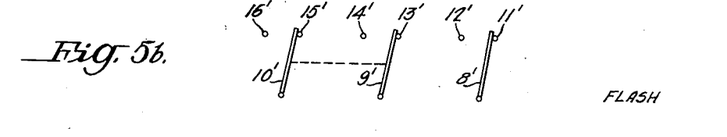
Figs. 5b and 5c illustrate the positions of the switch blades of the system of Fig. 5a during flash and normal operation respectively.

During flash (see Fig. 5b) the basic circuit 4' acts to arrange sections 2a and 2b of the heating unit in parallel across the line and to drop the subsequent load. Current can flow from $L_1$, through blade 8', contact 11', through blade 9', contact 13' to the junction of sections 2a and 2b. The current going through section 2a proceeds through blade 10' and contact 15' to the flash-and-variable input controller 5', where it meets the current flowing through section 2b. The subsequent load 6 is deenergized because the continuity of line $L_1$ is broken at blade 8'.

Figure 5C:
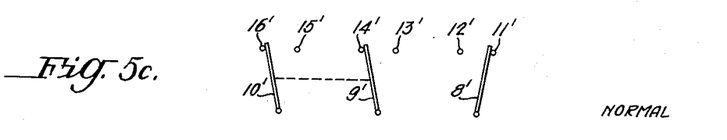

During normal operation (see Fig. 5c) the basic circuit 4' acts to arrange sections 2a and 2b in series across the power supply 3 and to restore the subsequent load. Current can flow from $L_1$, through blade 8', contact 11', through blade 9', contact 14', to contact 16', through blade 10', through sections 2a and 2b in series, through the controller 5' to line $L_2$. Continuity of power supply is provided from $L_1$ through blade 8', contact 11', through blade 9', contact 14' to heating unit 6.

Referring again to the systems shown in Figs. 2a, 3a and 4a, it should be noted that in each of the illustrated systems, the switch contacts which effect flash and normal operation of the controlled heating unit are biased toward the normal-operation position and are positively held in the flash position when the control knob is in the off position and during flash operation. Thus the contacts are positively retained in the normal-operation position, and are detained in the flash position when the control knob is in the off position and during the flash operation. This arrangement is particularly important in a system wherein variable input is effected by controlled making and breaking of the circuit supplying the controlled heating unit. Such arrangement prevents interference between the flashing and input controlling operations.

While certain embodiments of the invention have been illustrated and described, the invention is not limited thereto but is capable of various other embodiments as will be apparent to those skilled in the art.

I claim:

1. In a system for effecting overenergization of an electrical heating unit to heat the same rapidly and for effecting subsequent controlled normal operation of said unit, connections and switch means arranged to effect either overenergization or normal operation of the heating unit, said switch means including contacts having two operative positions for overenergization and normal operation respectively, means for effecting positive retention of said contacts in said normal-operation position, manual means having off and on positions for rendering said unit inoperative or operative, means actuated by said manual means for moving said contacts to overenergization position when said manual means is moved to the off position, means for detaining said contacts in the overenergization position when said manual means is moved to on position, whereby overenergization of said unit is automatically instituted when said manual means is moved to on position to render said unit operative, means automatically operative to cause movement of said contacts to normal-operation position after a time interval, and means including a circuit making and breaking device for controlling the subsequent normal energization of said unit.

2. In a system for effecting overenergization of an electrical heating unit to heat the same rapidly and for effecting subsequent controlled normal operation of said unit, means for effecting either overenergization or normal operation of the heating unit, said means including switch means operable between on and off positions and additional switch means having two operative positions for overenergization and normal operation respectively, said last switch means being biased toward the normal-operation position for positive retention therein, manual means having off and on positions for rendering said unit inoperative or operative, means effective to set said last switch means in overenergization position when said manual means is moved to the off position, means for latching said last switch means in overenergization position, whereby overenergization of said unit is automatically instituted when said manual means is moved to on position to render said unit operative, means automatically operative to release said latching means after a time interval to cause said last switch means to assume its normal-operation position, and means including a circuit making and breaking device for controlling the subsequent normal energization of said unit.

3. In a system for effecting overenergization of an electrical heating unit to heat the same rapidly and for effecting subsequent normal operation of said unit at a preselected average rate of energization, connections and switch means arranged to effect either overenergization or normal operation of the heating unit, said switch means including contacts having two operative positions for overenergization or normal operation respectively, said switch means being biased toward the normal-operation position for positive retention therein, manual means having off and on positions for rendering said unit inoperative or operative and for preselecting the desired average rate of energization of the unit, means effective to set said switch means in overenergization position when said manual means is moved to off position, means for latching said switch means in overenergization position, whereby overenergization of said unit is automatically instituted when said manual means is moved to on position to render said unit operative, means automatically operative to release said latching means after a time interval to cause said switch means to assume its normal-operation position, and means including a circuit making and breaking device for controlling the subsequent normal energization of said unit so as to maintain the preselected average rate of energization.

4. In a system for effecting overenergization of an electrical heating unit to heat the same rapidly and for effecting subsequent controlled normal operation of said unit, connections and switch means arranged to effect either overenergization or normal operation of the heating unit, said switch means having two operative positions for overenergization and normal operation respectively, said switch means being biased toward the normal-operation position for positive retention therein, manual means having off and on positions for rendering said unit inoperative or operative, overcenter toggle latch means operable by said manual means to set and detain said switch means in overenergization position when said manual means is moved to off position, whereby overenergization of said unit is automatically instituted when said manual means is moved to on position to render said unit operative, means automatically operative to release said latching means after a time interval to cause said switch means to assume its normal-operation position, and means for controlling the subsequent normal energization of said unit.

5. In a system for effecting selected-temperature overenergization and normal operation of an electrical heating unit having two sections, connections and switch means arranged to effect either parallel or series connection of said sections whereby to effect either overenergization or normal operation of the heating unit, said switch means having two operative positions for overenergization and normal operation respectively, said switch means being biased toward the normal-operation position for positive retention therein, manual means having off and on positions for rendering said unit inoperative or operative, overcenter toggle latch means operable by said manual means to set and detain said switch means in overenergization position when said manual means is moved to off position, whereby overenergization of said unit is automatically instituted when said manual means is moved to on position to render said unit operative, means automatically operative to release said latching means after a time interval to cause said switch means to assume its normal-operation position, and means for controlling the subsequent normal energization of said unit.

6. In a system for effecting overenergization of an electrical heating unit to heat the same rapidly and for effecting subsequent controlled normal operation of said unit, means for effecting either overenergization or normal operation of the heating unit, said means including switch means operable between on and off positions and additional switch means having two operative positions for overenergization and normal operation respectively, said last switch means being biased toward the normal-operation position for positive retention therein, manual means having off and on positions for rendering said unit inoperative or operative, prop-type latch means rendered operable by said manual means to set and detain said last switch means in overenergization position when said manual means is moved to off position, whereby overenergization of said unit is automatically instituted when said manual means is moved to on position to render said unit operative, means automatically operative to release said latching means after a time interval to cause said last switch means to assume its normal-operation position, and means for controlling the subsequent normal energization of said unit.

7. In a system for effecting selected-temperature overenergization and normal operation of an electrical heating unit having two sections, means for effecting either parallel or series connection of said sections whereby to effect either overenergization or normal operation of the heating unit, said means including switch means operative between on and off positions and additional switch means having two operative positions for overenergization and normal operation respectively, said last switch means being biased toward the normal-operation position for positive retention therein, manual means having off and on positions for rendering said unit inoperative or operative, prop-latch means rendered operable by said manual means to set and detain said last switch means in overenergization position when said manual means is moved to off position, whereby overenergization of said unit is automatically instituted when said manual means is moved to on position to render said unit operative, means automatically operative to release said latching means after a time interval to cause said last switch means to assume its normal-operation position, and means for controlling the subsequent normal energization of said unit.

8. In a system for effecting overenergization of an electrical heating unit to heat the same rapidly and for effecting subsequent controlled normal operation of said unit, means for effecting either overenergization or normal operation of the heating unit, said means including switch means operable between on and off positions and additional switch means having two operative positions for overenergization and normal operation respectively, said last switch means being biased toward the normal-operation position for positive retention therein, manual means having off and on positions for rendering said unit inoperative or operative, means effective to set said last switch means in overenergization position when said manual means is moved to off position, means for latching said last switch means in overenergization position, whereby overenergization of said unit is automatically instituted when said manual means is moved to on position to render said unit operative, and means including a single thermostatic switch for releasing said latching means to cause said last switch means to assume its normal-operation position, and for controlling the subsequent normal energization of said unit.

9. In a system for effecting selected-temperature overenergization and normal operation of an electrical heating unit having two sections, means for effecting either parallel or series connection of said sections whereby to effect either overenergization or normal operation of the heating unit, said means including switch means operative between on and off positions and additional switch means having two operative positions for overenergization and normal operation respectively, said last switch means being biased toward the normal-operation position for positive retention therein, manual means having off and on positions for rendering said unit inoperative or operative, means effective to set said last switch means in overenergization position when said manual means is moved to off position, means for latching said last switch means in overenergization position, whereby overenergization of said unit is automatically instituted when said manual means is moved to on position to render said unit operative, and means including a single thermostatic switch for releasing said latching means to cause said last switch means to assume its normal-operation position, and for controlling the subsequent normal energization of said unit.

10. In a system for effecting overenergization of an electrical heating unit to heat the same rapidly and for effecting subsequent controlled normal operation of said unit, connections and switch means arranged to effect either overenergization or normal operation of the heating unit, said switch means having two operative positions for overenergization and normal operation respectively, said switch means being biased toward the normal-operation position for positive retention therein, manual means having off and on positions for rendering said unit inoperative or operative, overcenter toggle latch means operable by said manual means to set and detain said switch means in overenergization position when said manual means is moved to off position, whereby overenergization of said unit is automatically instituted when said manual means is moved to on position to render said unit operative, and means including a single thermostatic switch for releasing said latching means to cause said switch means to assume its normal-operation position, and for controlling the subsequent normal energization of said unit.

11. In a system for effecting selected-temperature overenergization and normal operation of an electrical heating unit, means for effecting either overenergization or normal operation of the heating unit, said means including switch means operable between on and off positions and additional switch means having two operative positions for overenergization and normal operation respectively, said last switch means being biased toward the normal-operation position for positive retention therein, manual means having off and on positions for rendering said unit inoperative or operative and for preselecting the desired average rate of energization of the unit, latch means rendered operable by said manual element to set and detain said last switch means in overenergization position when said manual means is moved to off position, whereby overenergization of said unit is automatically instituted when said manual means is moved to on position to render said unit operative, said latch means including a bimetal member, and a thermostatic switch adjustable by said manual means, and operatively associated with said bimetal member, to control release of said latch means and consequent termination of the overenergization and to control the subsequent normal energization of said unit so as to maintain the preselected average rate of energization.

12. In a system for effecting selected-temperature overenergization and normal operation of an electrical heating unit, means for effecting either overenergization or normal operation of the heating unit, said means including switch means operable between on and off positions and additional switch means having two operative positions for overenergization and normal operation respectively, said last switch means being biased toward the normal-operation position for positive retention therein, manual means having off and on positions for rendering said unit inoperative or operative and for preselecting the desired average rate of energization of the unit, latch means rendered operable by said manual means to set and detain said last switch means in overenergization position when said manual means is moved to off position, whereby overenergization of said unit is automatically instituted when said manual means is moved to on position to render said unit operative, said latch means including a bimetal member, a switch operable conjointly with said last switch means and connected in series with said bimetal member, and a thermostatic switch adjustable by said manual means, and connected in shunt relation with said bimetal member and said last-named switch, to control release of said latch means and consequent termination of the overenergization and to control the subsequent normal energization of said unit so as to maintain the preselected average rate of energization.

13. In a system for effecting selected-temperature overenergization and normal operation of an electrical heating unit, means for effecting either overenergization or normal operation of the heating unit, said means including switch means operable between on and off positions and additional switch means having two operative positions for overenergization and normal operation respectively, said last switch means being biased toward the normal-operation position for positive retention therein, manual means having off and on positions for rendering said unit inoperative or operative and for preselecting the desired average rate of energization of the unit, latch means rendered operable by said manual means to set and detain said last switch means in overenergization position when said manual means is moved to off position, whereby overenergization of said unit is automatically instituted when said manual means is moved to on position to render said unit operative, said latch means including a bimetal member normally out of circuit with said heating unit, and thermostatic switch means adjustable by said manual means and adapted to include said bimetal member in circuit with said heating unit to effect release of said latch means to terminate the overenergization, said thermostatic switch means being effective thereafter to control the normal energization of said unit so as to maintain the preselected average rate of energization.

14. In a system for effecting overenergization and normal operation of an electrical heating unit having two sections and for dropping subsequent load during the overenergization of said unit, switch means for controlling the operation of said unit, said switch means consisting of three pairs of stationary contacts and three movable contact blades associated respectively with the pairs of stationary contacts, connections controlled by said switch means for effecting either parallel or series connection of said sections to effect overenergization or normal operation of said unit, and for dropping subsequent load during the parallel connection of said sections, the parallel or series connection of said sections being under control of two of said movable contact blades, manual control means having off and on positions and serving to control said switch means, means for causing disposition and detention of the said two movable blades in the parallel-connection position when said manual means is moved to off position, whereby overenergization of said unit is automatically instituted when said manual means is moved to on position, and means automatically operative to cause said two movable blades to assume their normal-operation position after a time interval.

15. In a system for effecting overenergization and normal operation of an electrical heating unit having two sections and for dropping subsequent load during the overenergization of said unit, switch means for controlling the operation of said unit, said switch means comprising three pairs of stationary contacts and three movable contact blades associated respectively with the pairs of stationary contacts, connections controlled by said switch means for effecting either parallel or series connection of said sections to effect overenergization or normal operation of said unit, and for dropping subsequent load during the parallel connection of said sections, the parallel or series connection of said sections being under control of two of said movable contact blades, said two movable blades being biased toward the normal-operation position for positive retention therein, manual control means having off and on positions and serving to control said switch means, means operable by said control means to set said two movable blades in the parallel-connection position when said manual means is moved to off position, means for latching said two movable blades in the parallel-connection position, whereby overenergization of said unit is automatically instituted when said manual means is moved to on position, and means automatically operative to release said latching means after a time interval to cause said two movable blades to assume their normal-operation position.

16. In a system for effecting overenergization and normal operation of an electrical heating unit having two sections and for dropping subsequent load during the overenergization of said unit, switch means for controlling the operation of said unit, said switch means comprising three pairs of stationary contacts and three movable contact blades associated respectively with the pairs of stationary contacts, connections controlled by said switch means for effecting either parallel or series connection of said sections to effect either overenergization or normal operation of said unit, and for dropping subsequent load during the parallel connection of said sections, the parallel or series connection of said sections being under control of two of said movable contact blades, said two movable blades being biased toward the normal-operation position for positive retention therein, manual control means having off and on positions and serving to control said switch means, latch means rendered operable by said manual means to set and detain said said two movable blades in the parallel-connection position when said manual means is moved to off position, whereby overenergization of said unit is automatically instituted when said manual means is moved to on position, said latch means including a bimetal member, and a thermostatic switch adjustable by said manual means, and operatively associated with said bimetal member, to control release of said latch means and consequent termination of the overenergization.

17. In a system for effecting overenergization and normal operation of an electrical heating unit having two sections and for dropping subsequent load during the overenergization of said unit, switch means for controlling the operation of said unit, said switch means comprising three pairs of stationary contacts and three movable contact blades associated respectively with the pairs of stationary contacts, connections controlled by said switch means for effecting either parallel or series connection of said sections to effect either overenergization or normal operation of said unit, and for dropping subsequent load during the parallel connection of said sections, said two movable blades being biased toward the normal-operation position for positive retention therein, manual control means having off and on positions and serving to control said switch means, latch means rendered operable by said manual means to set and detain said two movable blades in the parallel-connection position when said manual means is moved to off position, whereby overenergization of said unit is automatically instituted when said manual means is moved to on position, said latch means including a bimetal member, a switch operable conjointly with said switch means and connected in series with said bimetal member, and a thermostatic switch adjustable by said manual means, and connected in shunt relation with said bimetal member and said last-named switch, to control release of said latch means and consequent termination of the overenergization.

WALTER H. VOGELSBERG.

References Cited in the file of this patent

UNITED STATES PATENTS

| Number | Name | Date |
| --- | --- | --- |
| 2,210,947 | Myers et al. | Aug. 13, 1940 |
| 2,327,925 | Myers | Aug. 24, 1943 |
| 2,357,225 | Roesch et al. | Aug. 29, 1944 |
| 2,451,576 | Pearce | Oct. 19, 1948 |